Figure 1:
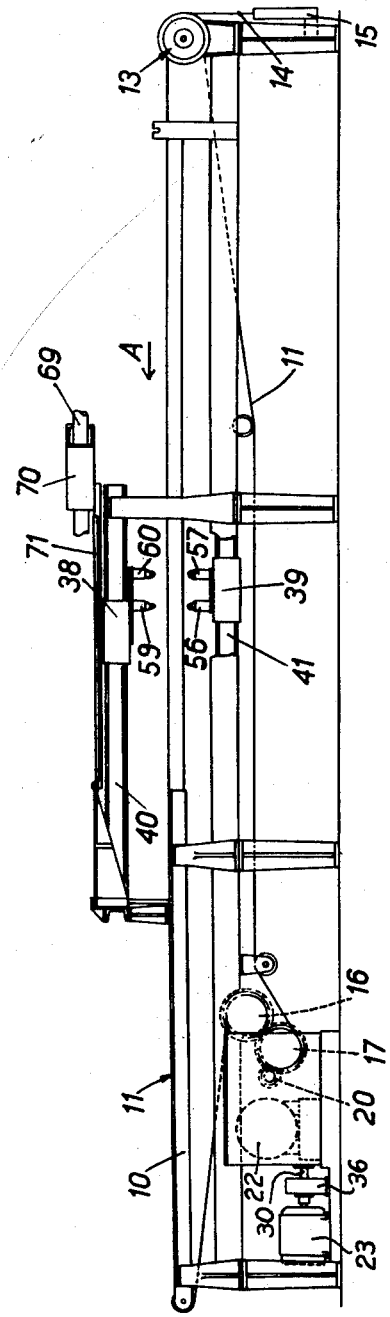

March 13, 1956 D. M. POWER ET AL 2,738,007
CUTTING MACHINE HAVING PHOTOELECTRIC DETECTORS FOR
SEVERING STRIPS OF FABRIC OF PREDETERMINED
WIDTH FROM A LENGTH THEREOF
Filed Dec. 28, 1954 7 Sheets-Sheet 1

INVENTORS
Douglas Merton Power
Norman Ashcroft Hurst
by Benj. T. Rauber
their attorney March 13, 1956  D. M. POWER ET AL  2,738,007
CUTTING MACHINE HAVING PHOTOELECTRIC DETECTORS FOR
SEVERING STRIPS OF FABRIC OF PREDETERMINED
WIDTH FROM A LENGTH THEREOF
Filed Dec. 28, 1954  7 Sheets-Sheet 5

INVENTORS
Douglas Merston Power
Norman Ashcroft Hurst
by Benj. T. Rauber
their attorney

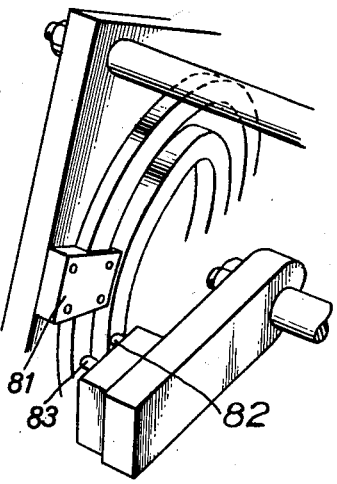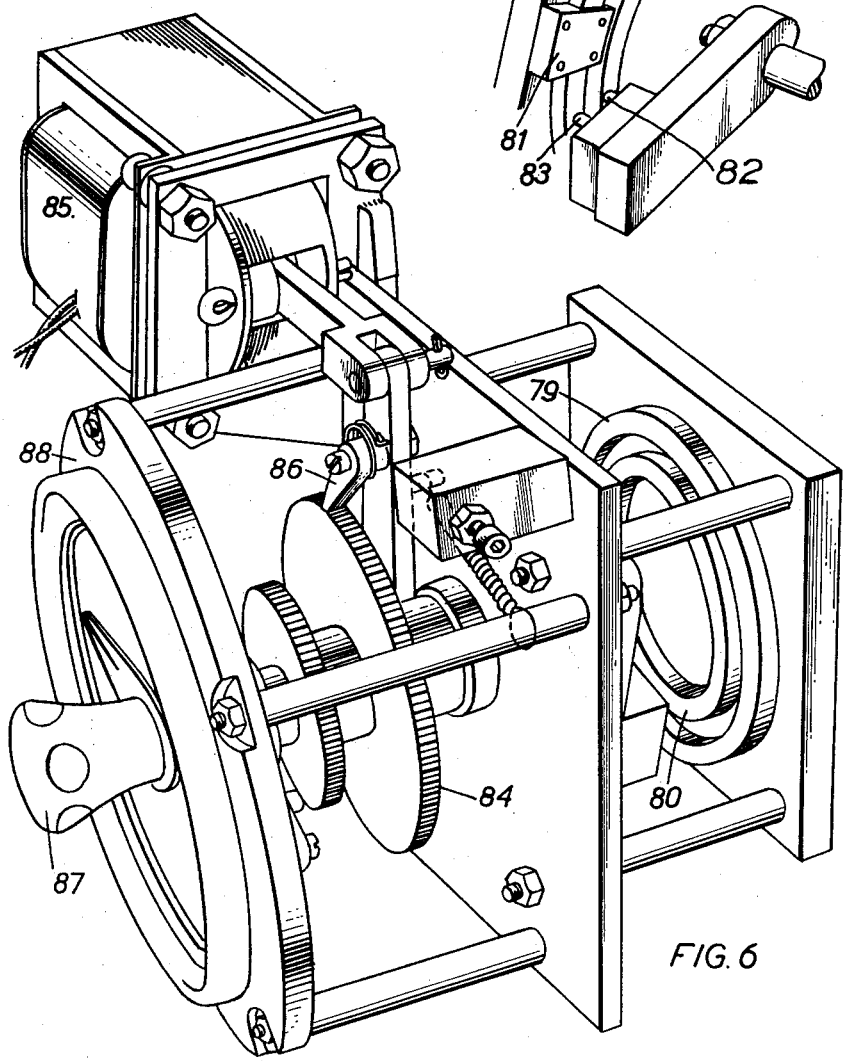

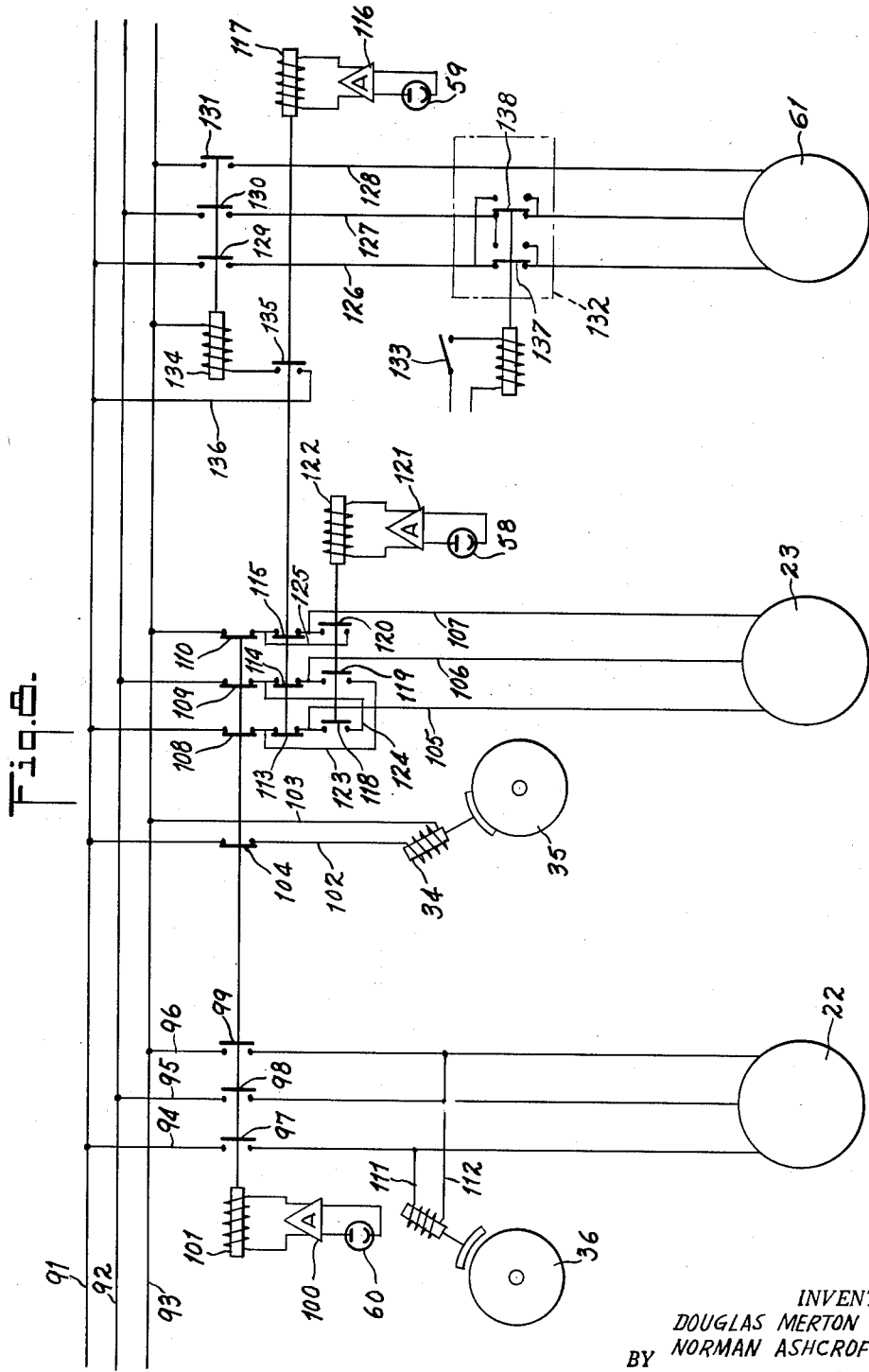

United States Patent Office 2,738,007
Patented Mar. 13, 1956

2,738,007

CUTTING MACHINE HAVING PHOTOELECTRIC DETECTORS FOR SEVERING STRIPS OF FABRIC OF PREDETERMINED WIDTH FROM A LENGTH THEREOF

Douglas Merton Power and Norman Ashcroft Hurst, Liverpool, England, assignors to Dunlop Tire and Rubber Corporation, Buffalo, N. Y., a corporation of New York Application December 28, 1954, Serial No. 477,968

9 Claims. (Cl. 164—76)

This invention relates to bias cutting machines.

When preparing rubberized fabric for the manufacture of pneumatic tires a bias cutting machine has been used to bias cut the fabric into a plurality of batches of different and predetermined lengths. Such machines usually comprise a power driven circular knife traversable augularly across a conveyor. The conveyor is brought to rest, after the requisite length of fabric has been conveyed past the knife, by means of an automatic solenoid brake.

In view of the high operating speed which is desirable and the need, on grounds of economy, for the severing of exact lengths of fabric, continual manual correction of the position of the fabric relative to the knife is necessary to compensate for the errors resulting from unreliability of the solenoid brake under the severe and exacting operating conditions.

Our invention provides a bias cutting machine which accurately severs strips of fabric of predetermined width from a length thereof.

The bias cutting machine of our invention comprises an endless belt conveyor, means for driving the conveyor at a predetermined normal speed, means for driving the conveyor at a reduced speed, three photoelectric detectors each comprising a photoelectric cell and means for projecting a beam of light thereon so arranged that their beams will be interrupted in succession by the leading edge of a sheet of fabric carried by the conveyor, the points of interruption of the second and third beams being close together and relatively distant from that of the first beam, means actuated by interruption of the first beam during the normal speed drive to engage the reduced speed drive, means actuated by interruption of the second beam to stop the conveyor, means actuated by interruption of the third beam to start the reduced speed drive in reverse, means for cutting the fabric and delayed action means for operating the cutting means said delayed action means being actuated by interruption of the second beam only while the third beam is unobscured.

Preferably the conveyor drive comprises a pair of electric motors for driving the conveyor through a common differential-type gear box. The gear box is controlled by a braking mechanism whereby one or other of the motors may singly provide the drive at a fast or slow speed, one of the said motors being reversible by the third detector in order to drive the conveyor in the opposite direction.

Preferably also the photoelectric detectors each comprise a light source mounted on one side of the conveyor so as to provide a narrow beam of light at, or adjacent to, the upper surface of the conveyor and an associated photoelectric cell on the other side of the conveyor.

One embodiment of a bias cutting machine in accordance with our invention is illustrated diagrammatically by way of example with reference in the accompanying drawings, in which—

Figure 2:
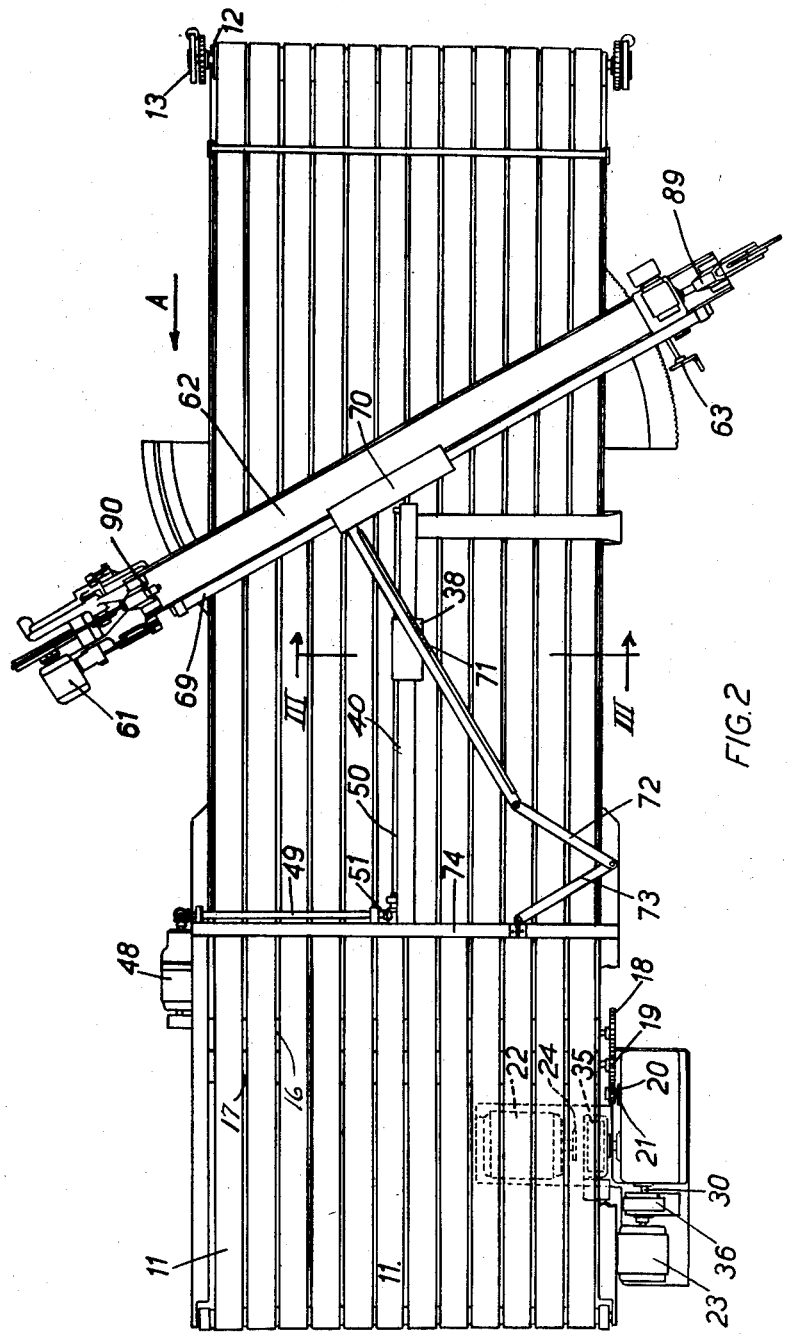
Figure 3:
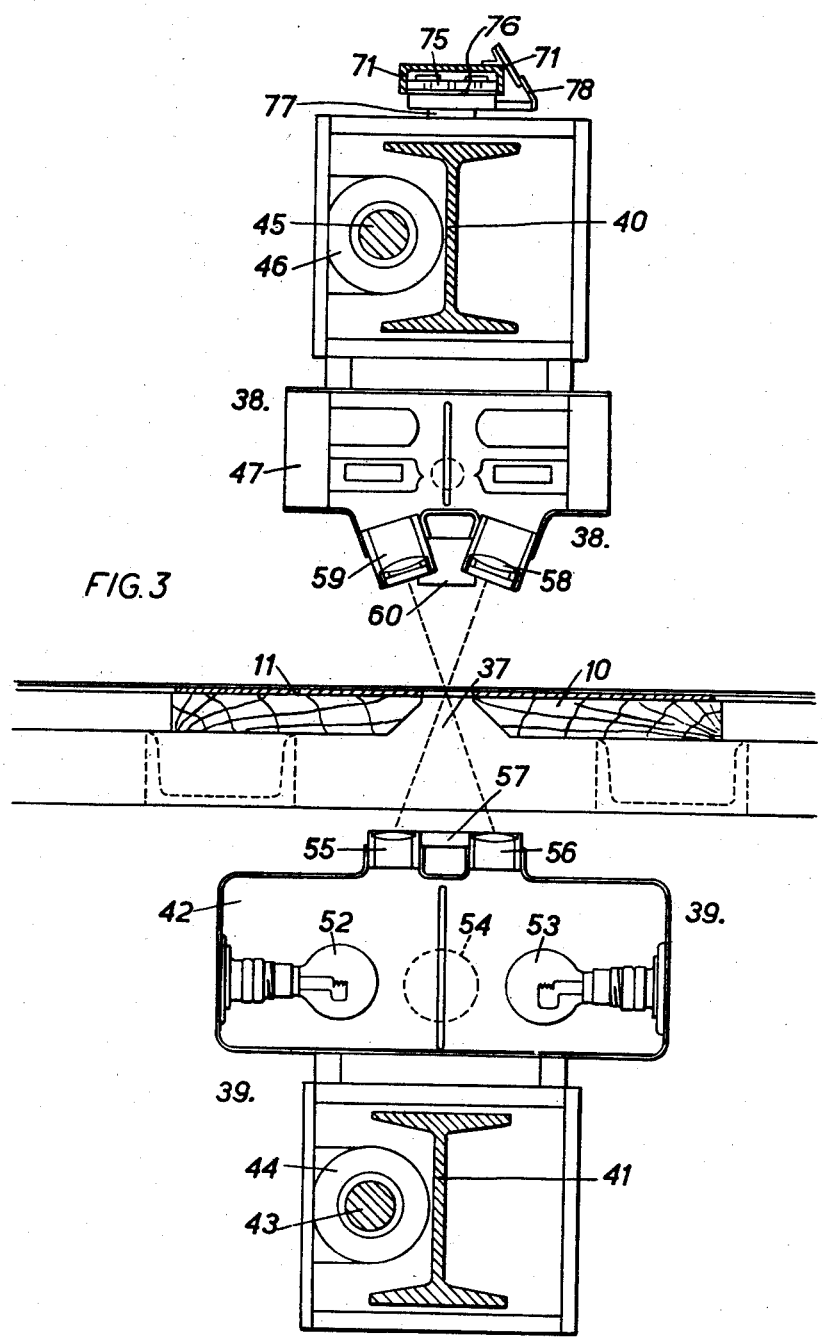
Figure 4:
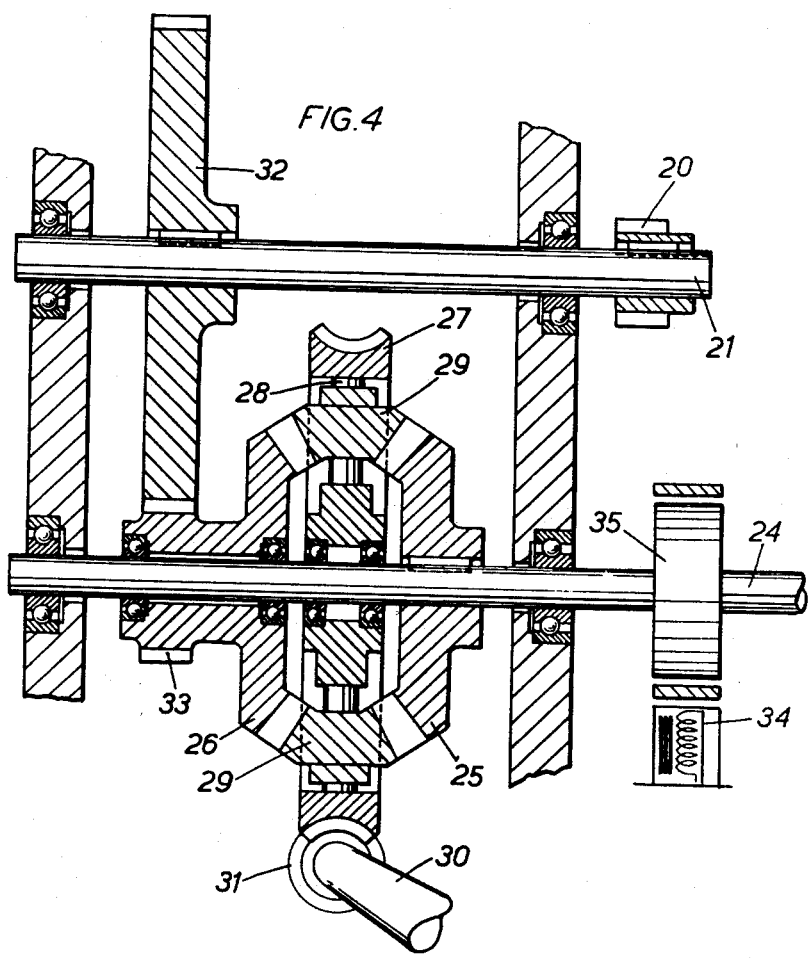
Figure 5:
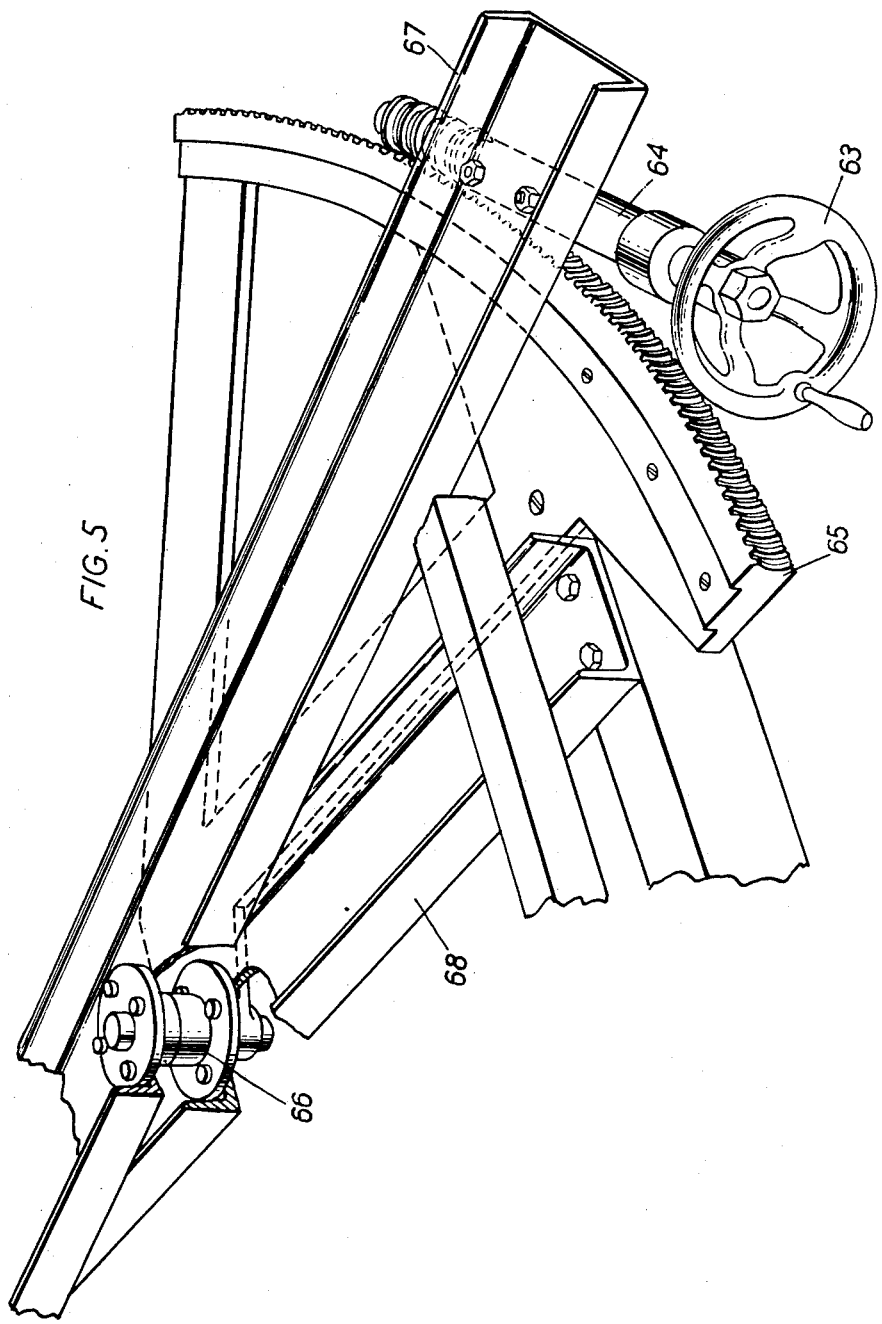

Fig. 1 is a front elevation of the machine;
Fig. 2 is a plan view thereof;
Fig. 3 is a cross-sectional view on the lines III—III of Fig. 2;
Fig. 4 is a detailed sectional view of a differential gear;
Fig. 5 is a fragmentary perspective view of means for adjusting the angle of the cutter;
Fig. 6 is a perspective view of a counting device for use with the bias cutting machine;
Fig. 7 is a fragmentary view of part of the apparatus shown in Fig. 6, and
Fig. 8 is an illustrative wiring diagram of an electric control circuit for the apparatus.

In the embodiment illustrated in the accompanying drawings, the machine comprises a table 10 and a plurality of fabric supporting conveyor belts 11 which extend longitudinally of the table, the top flights of the belts running parallel with and adjacent to the top surface of the table and moving from right to left as shown by the arrow A in Figs. 1 and 2. At one end of the table the belts 11 pass round an eccentrically mounted roller 12 having at each end a pulley 13 around the periphery of which is wound a tensioning cable 14 attached to a tensioning spring 15. Rotation of the eccentric roller 12 is resisted by the springs 15 so as to provide belt tension. At the other end of the table the belt passes about an idler roller and then round the peripheries of a pair of driving rollers 16, 17 which are geared together by gear wheels 18 and 19, Fig. 2, and driven by a gear box output shaft 21 by toothed pinion 20 forming part of a differential gear box which is driven by a pair of electric motors 22, 23 in the manner now to be described.

The differential gear box comprises a main input shaft 24 having a bevel wheel 25 rigidly keyed thereto and in addition, in spaced relationship to said bevel wheel, a second bevel wheel 26 which is freely rotatable on the input shaft 24. A worm wheel 27 is freely rotatably on the main input shaft 24, Fig. 4, between the bevel wheels, the worm wheel carrying on diametrically opposite radially extending pins 28 a pair of bevel pinions 29 engaging the bevel wheels 25, 26. A secondary input shaft 30 is located in the differential gear box at right angles to the main input shaft 24, the secondary shaft carrying a worm gear 31 which engages with the worm wheel 27. A gear box output shaft 21 is mounted in the box in parallel relationship to the main input shaft 24 and takes its drive through a gear wheel 32 and a pinion 33 rigidly attached to the bevel wheel 26 which is freely rotatable on the main input shaft 24. The output shaft 21 projects from the box and is provided with a straight toothed pinion 20 which drivably engages with the gear 19 on the conveyor driving roller 17 (Fig. 1).

The main input shaft 24 is connected to a main driving motor 22 provided with a high and a low speed winding and is provided with a solenoid operated brake 34, 35. The second input shaft 30 is connected to the small correction motor 23 and is provided with a solenoid operated brake 36. Thus by engaging only the main motor brake 34, 35 the rigidly keyed bevel wheel 25 is held stationary so that the drive from the correction motor 23 will cause the bevel pinions 29 to rotate round the said bevel wheel 25 with planetary motion and provide a low speed drive to the output shaft 21. If, however, the correction motor brake 36 only is applied, the main motor 22 will drive the output shaft 21 at high speed directly through the bevel pinions 29 which are incapable of planetary motion since the worm wheel 27 upon which they are mounted is held stationary.

A longitudinally extending slot 37 (Fig. 3) located between a pair of the belts 11, is provided in the upper surface of the conveyor table 10 and a group of photoelectric cells 38 and associated light sources 39 (referred to collectively as photoelectric detectors) are located in relation to the slot as will now be described.

Rails 40 and 41 (Fig. 1) are located respectively above and below the table, and extend parallel with the slot 37.

The lower rail 41 carries a lamp housing 42 which is traversable along the rail by means of a rotatable screw 43 and a nut 44 fixed in the housing, a similar arrangement 45, 46 being provided for a photoelectric cell housing 47 traversable along the upper rail 40. Both housings 42, 47 are simultaneously movable by means of a geared electric motor 48 which drives the screws 43, 45 through a series of inter-connecting shafts 49, 50 and bevel gears 51. The geared electric motor 48 is controlled by an electric circuit which includes push button control for rotating the electric motor in either direction so as simultaneously to adjust the position of the lamp and photoelectric cell housings 42, 47 relative to the slot. The lamp housing 42 contains, in separate compartments, three lamps 52, 53, 54 of low voltage, linear filament type and associated lenses 55, 56, 57 which project light beams through the slot to a point of focus in the plane containing the upper surface of the conveyor belts. The light beams are projected onto lenses 58, 59, 60 respectively, provided in the photoelectric cell housing 47 for projecting the light onto the cathodes of corresponding photoelectric cells mounted in separate compartments. Each photoelectric cell is connected to a pre-amplifier which supplies a signal to a main amplifier mounted on a control cubicle located adjacent to the bias cutting machine.

The photoelectric cells and lamps are mounted in succession longitudinally of the slot and will be referred to hereinafter as the first, second and third detectors, lamps or cells, the first and second detectors 60 and 59 and their respective lamps 54 and 53, respectively, being mounted relative to the conveyor motion, in advance of the third detector 58 and its lamp 52. The focal points of the second and third lamps 53, 52 respectively are located centrally of the slot but are spaced apart about 1/16" measured longitudinally of the slot, the distance being adjustable by movement of the second and third lamps and cells relative to their housings.

The first photoelectric detector 54, 57, 60 is associated with an electric circuit whereby when the cell thereof is de-energized the main motor 22 is switched from high speed running to a regenerative braking circuit, the solenoid operated brake 34, 35, for the main motor and the windings of the correction motor 23 being simultaneously energized.

The second photoelectric detector 53, 56, 59 is associated with an electric circuit whereby when the said detector is de-energized the solenoid brake 36 associated with the correction motor 23 is de-energized and the correction motor energized so as to drive the conveyor in reverse.

The bias cutting machine is provided with a power driven rotatable knife, of the type usually fitted to such machines, which is traversable by means of an electric motor 61 (Fig. 2) along the length of guide rails 62 located above the conveyor belts 11 and across the width thereof and is adjustable angularly to the travel of the belts 11 as herein described and for this purpose is mounted at its ends on a lower main channel 67 (Fig. 5) below the table 10 and belts 11. The angular position of the rails 62 and 67, and consequently the angle at which tire fabric mounted on the conveyor will be bias cut, is adjusted by means of a hand-wheel 63 connected to a worm wheel shaft 64 rotatably mounted on the lower main channel 67, the worm shaft drivably meshing with a worm wheel segment 65 rigidly attached to the conveyor frame. The lower main channel 67 is pivotally mounted at 66 on a supporting channel 68 forming part of the machine structure and located below the conveyor. Means are provided for continuously measuring the width of fabric cut, i. e. the shortest distance between the track of the rotatable cutting knife and a point located between the light beams associated with the second and third photoelectric cells.

The means for continuously measuring the width of the strip (Fig. 2) comprises a supporting tube 69 mounted on the guide rail 62 and extending parallel therewith and a carriage 70 freely slidable along the length of the tube and having a scale bar 71 rigidly attached thereto and extending at right angles to the tube 69. The scale bar 71 is supported at its end remote from the carriage by means of a pair of freely pivoted links 72, 73 attached to a cross-member 74 of the conveyor frame. The scale bar 71 has a channel-shaped cross-section, the flanges thereof being disposed vertcially so that the channel fits over a group of four rollers 75 (two of which are shown in Fig. 3) mounted on vertical axes. The rollers are mounted on a supporting plate 76 pivotable on shaft 77 mounted on the cell housing 38 with its axis passing through the measuring point located between the light beams associated with the third and second detectors 52, 55, 58 and 53, 56, 59 respectively. The group of four rollers 75 by virtue of its location between said flanges, constrains the scale bar so that a pointer 78 rigidly attached to the plate 76 supporting the rollers, will indicate on the scale bar 71 the exact distance between the knife track and measuring point, i. e. the fabric width, whatever the angular disposition of the cutter rail.

An electrical counting device is provided so that the machine will be stopped after a predetermined number of cutting operations have been completed. The counting device (Figs. 6 and 7) comprises a pair of slip rings 79, 80, slip ring 79 being provided with an insulated portion 81 (Fig. 7) and a pair of contact brushes 82, 83 running on the slip rings so as to form an electrical connection or bridge therebetween. The brushes are associated with and driven by a ratchet wheel 84 rotatable, by means of a solenoid 85 and pawl mechanism 86, one tooth at a time, the solenoid being actuated once for each cutting operation. A knob 87 and indicating dial 88 are provided so that the position of the brushes relative to the insulated portion 81 of the slip ring 79 may be adjusted independently of the ratchet so that after a predetermined number of cutting operations, indicated on the dial, the brush 83 comes onto the insulated portion 81 of the slip ring 79. The slip rings are connected in circuit with the conveyor master contactor so that when the slip rings are not electrically interconnected by the brushes the conveyor will be stopped.

Fig. 8 shows a wiring diagram of an electric circuit that may be used for the various steps and elements of the invention, only the main features of the electric circuits being shown, mechanical and electric details being omitted in the interest of clarity and simplicity. It will be understood that the circuit shown is purely for purposes of illustration of the operation of the various elements of the invention and that other variants may be used.

In the circuit illustrated current is supplied from the mains 91, 92 and 93 through the leads 94, 95 and 96 and the switches 97, 98 and 99, respectively, to the motor 22. The switches 97, 98 and 99 are collectively controlled by the photoelectric cell 60 through the amplifier 100 and the solenoid 101, the switches being closed when the photoelectric cell, the amplifier and the solenoid are energized and open when the photoelectric cell is de-energized by cutting off its supply of light as the leading edge of the fabric passes underneath it. Current is supplied to the brake 34 through leads 102 and 103 and a switch 104, the switch 104 being open when the cell 60 is energized and closed to apply the brake when the cell is de-energized.

Electric current is supplied from the mains to the motor 23 though leads 105, 106 and 107 and switches 108, 109 and 110, respectively, controlled by the cell 60 and closed when the cell is de-energized and open when the cell is energized. The brake 36 receives current from the leads 94 and 96 through leads 111 and 112 after passing through the switches. In series with the switches 108, 109 and 110 are switches 113, 114 and 115 controlled by the photoelectric cell 59 through an amplifier 116 and solenoid 117, these switches being open when the cell 59 is de-energized and closed when it is energized. Also in series with the switches 108, 109 and 110 and in parallel with the switches 113, 114 and 115 are reversing switches 118, 119 and 120, respectively, controlled by the photoelectric cell 58 through an amplifier 121 and a solenoid 122, these switches being open when the cell 58 is energized and closed when it is de-energized. The reversing circuit is illustrated by the shunt circuits 123, 124 and 125 to change the relation of the leads 105, 106 and 107 to the mains 91, 92 and 93, this arrangement being to indicate a reversing relation rather than a complete reversing circuit.

Current for the knife traverse motor is supplied from the mains 91, 92 and 93 through leads 126, 127 and 128 and switches 129, 130 and 131, respectively, and through a reversing switch 132 controlled by a limit switch 133 actuated by the knife carrying carriage at the end of its cutting stroke. The switches 129, 130 and 131 are controlled by a delayed action relay 134 controlled by a switch 135 in a circuit 136, the switch 135 being closed when the photoelectric cell 59 is de-energized and the solenoid 117 is de-energized. The action of the relay 134 is delayed for a short time to permit the motor 23 to come to a rest before the knife starts to travel. When the knife completes its forward movement the limit switch 133 shifts the switches 137 and 138 to reverse two leads to the motor and the motor reverses its rotation to return the carriage to its starting position.

It will be apparent that, using the above illustrated circuit, with the cells 58, 59 and 60 all energized, the switches 97, 98 and 99 will be closed so that the motor 22 will rotate while the brake 36 is applied. The switches 108, 109 and 110 being open, the motor 23 does not rotate. The motor 22 then drives the shaft 24 and the gears 25 and 26 to move the belts forwardly. When the photoelectric cell 60 is de-energized by the interruption of light by the advancing fabric, the switches 97, 98 and 99 open, stopping the motor and releasing the brake and the switch 104 closes to apply the brake 35. The switches 108, 109 and 110 are closed and as the switches 113, 114 and 115 are closed the motor 23 rotates, driving the shaft 30 and the gear 26 forward slowly. When the cell 59 is de-energized the switches 113, 114 and 115 open stopping the motor 23. If the fabric should over run its limit, the cell 58 will be de-energized, reversing the switches 118, 119 and 120 and reversing the movement of the belts and thus bring them to a stop with the advance edge of the fabric between the short space between the cells 58 and 59. As the cell 59 is energized the switch 135 to the delayed action relay 134 is closed and after a short interval the knife traversing motor 61 is put in forward motion to be reversed when the limit switch 133 is closed.

The operation of the machine just outlined will now be described.

A length of rubberized tire cord fabric is led onto the conveyor belts 11 and is supported thereby adjacent to the top of the table 10. The required bias angle is set by means of the handle 63 and the position of the detectors is adjusted by means of the press button control so that the correct width of fabric to be cut is indicated on the scale 71, the carriage 70 sliding freely on the supporting tube 69. The main driving motor 22 is then driven at slow speed so that the fabric is carried forward in the direction indicated by the arrow A (Fig. 2) just beyond the track of the rotatable knife. The knife is then operated by manual control so that the leading edge of the fabric is cut to the correct bias angle in accordance with the predetermined setting. The knob 87 of the counting device is then set to indicate on the dial 88 the correct batch quantity and the master contactor is then closed.

The main motor 22 runs initially on the high speed winding and the leading edge of the fabric is conveyed along the table so as to cut off the light passing from the first lamp 54 in a lens 60 to the first photoelectric cell. This operates the electric circuit for de-energizing the motor 22 applying regenerative braking thereto and also operating the solenoid operated brake 34, 35, associated therewith in order to bring the main motor to rest. Simultaneously the cutting of this light beam switches on the correction motor 23 and disengages its solenoid operated brake 36 so that the conveyor belts 11 are not stopped but are driven forward at slow speed by the correction motor 23 until the leading edge of the fabric breaks the light beam passing from the second lamp 53 through lens 59 to the second photoelectric cell which automatically de-energizes the correction motor 23 and applies its brake 36 so that the conveyor stops almost immediately from its slow forward movement.

When the distance between the light beams from the second and third lamps 52 and 53 respectively is adjusted so that they are longitudinally spaced by $\frac{1}{16}''$ it may be that the conveyor will not be stopped with the leading edge of the fabric between these two light beams—the only condition under which the cutter can be made to operate—but will be conveyed too far so as to cut the third light beam from lamp 53. The electric circuit associated with the third detector 53, 56, 59, will then be operated so as to reverse the correction motor 23 until the leading edge of the fabric is located between the second and third light beams.

When this condition obtains for a predetermined time interval the circuit associated with the knife is operated and the knife traverses across the rail 62 in order to sever a strip of fabric of the correct predetermined width.

At the end of the cutting stroke a mechanism 89 associated with the knife operates a switch device 90 so as momentarily to close the circuit to the main motor so that during the return traverse of the cutter the main motor commences to drive the conveyor forwardly in order to carry the newly formed edge of the fabric into its correct position prior to the severance of a second strip. Should the leading edge of the fabric be correctly positioned before the cutter has reached the end of its return traverse the cutter will be re-traversed without delay so as to perform a second cutting operation.

The operation of the machine is further electrically controlled in the following ways:

When the leading edge of the fabric overruns so as to cut the third light beam, the conditions, as the leading edge passes between the second and third beams prior to overrunning, will be correct for starting the knife traverse motor. This is undesirable since the fabric is not at rest end an incorrect length and an incorrectly formed leading edge would result were the knife allowed to traverse under such conditions. An electric circuit, of known type, is therefore incorporated so that the correct conditions must persist for a given time interval before the knife traverse can commence.

In order to protect the machine should the photoelectric equipment develop a fault, an electronic cut-out of known design is provided for stopping the machine if the fabric travels a distance greater than the maximum width cut by the machine which circumstances would obtain should a fault, of the kind referred to, develop. The cut-out is designed such that, should it develope a fault itself, this also would stop the machine.

In order to arrange for the cutting of narrow widths of fabric which could not normally be cut by the machine in view of the conveyor speed and of the wide spacing of the photoelectric cells, the machine may be operated with the main motor travelling at slow speed and with the distance between photoelectric cells reduced to a minimum.

This is effected by movement of the first lamp 54 and its associated photoelectric cell towards the second and third lamps 52, 53 and their associated cells by means of a geared electric motor. This movement is effected automatically when the machine is adjusted, by means of the motor 43 so as to cut strips below a certain predetermined width measurement. In addition, this adjustment automatically adjusts the electrical circuit so that the main motor operates at a relatively slow speed. Electrical interlocking of the circuits for switching the main motor to slow speed and for adjusting the distance between the first and the associated second and third detectors is provided so that until both these circuits have functioned correctly the electrical circuits controlling the remainder of the machine operations are rendered ineffective.

Thus the automatically controlled conveyor in accordance with the invention is capable of cutting a wide range of fabric strips at high speed and to a degree of accuracy such that the variation between strips cut on the same setting will not exceed a predetermined tolerance, for example, 1/16".

Having described our invention, what we claim is:

1. A bias cutting machine comprising an endless belt conveyor, means for driving the conveyor at a predetermined normal speed, means for driving the conveyor at a reduced speed, three photoelectric detectors each comprising a photoelectric cell and means for projecting a beam of light thereon so arranged that their beams will be interrupted in succession by the leading edge of a sheet of fabric carried by the conveyor, the points of interruption of the second and third beams being close together and relatively distant from that of the first beam, means actuated by interruption of the first beam during the normal speed drive to engage the reduced speed dive, means actuated by interruption of the second beam to stop the conveyor, means actuated by interruption of the third beam to start the reduced speed drive in reverse, means actuated when said third light beam is unobscured to stop said reduced spreed drive, means for cutting the fabric and delayed action means for operating the cutting means said delayed action means being actuated by interruption of the second beam only while the third beam is unobscured.

2. A bias cutting machine in accordance with claim 1 wherein the conveyor drive comprises a pair of electric motors one being a main motor for driving the conveyor at normal speed and the other a correction motor for driving the conveyor at reduced speed, the motors being drivably connected to the conveyor through a common differential gear box.

3. A bias cutting machine in accordance with claim 2 wherein the gear box is controlled by a braking mechanism whereby one or other of the motors may singly provide the drive at a fast or slow speed, the correction motor being reversible by the third photoelectric detector in order to drive the conveyor in the opposite direction.

4. A bias cutting machine in accordance with claim 1 wherein the photoelectric detectors each comprise a light source mounted on one side of the conveyor so as to provide a narrow beam of light at or adjacent to the upper surface of the conveyor and an associated photoelectric cell on the other side of the conveyor.

5. A bias cutting machine in accordance with claim 4 wherein the conveyor comprises a plurality of mutually parallel driving belts, the three photoelectric detector beams being adapted to pass between a pair of neighboring belts.

6. A bias cutting machine in accordance with claim 5 wherein the focal points of the light sources of the second and third detectors are spaced apart longitudinally of said gap by a distance of approximately 1/16".

7. A bias cutting machine in accordance with claim 1 wherein the means for cutting the fabric comprises a rotatable knife traversable by an electric motor along a guide rail angularly adjustable across the width of the fabric, said means being associated with means for continuously measuring the width of the fabric strip to be cut from the length of fabric.

8. A bias cutting machine in accordance with claim 7 wherein the means for continuously measuring the width of the strip to be cut comprises a tube or rod mounted on the cutter guide rail and extending parallel therewith, a carriage freely slidable along said tube or rod, a scale bar rigidly attached at one end at right angles to said carriage and attached at its other end by pivotal links to the machine frame, the pivotal axis of support for said bar being located above a point between the focal points of the second and third photoelectric detector light sources, said support carrying a pointer for indicating a measurement on said scale bar.

9. A bias cutting machine in accordance with claim 1 and incorporating an electrical counting device comprising a pair of slip rings one at least of which has an insulated gap in its circumference, a brush device for bridging said slip rings, means for effecting manual angular adjustment between said gap and the brush device to select the number of strips of fabric to be cut and means driven by the main motor for effecting relative movement between the gap and the brush device so as to bring said gap and brush device into coincidence to stop the motor after the predetermined number of strips of fabric have been cut.

References Cited in the file of this patent

UNITED STATES PATENTS

| | | |
|---|---|---|
| 2,003,027 | Wright | May 28, 1935 |
| 2,581,937 | Secrest | Jan. 8, 1952 |
| 2,681,103 | Hirsch | June 15, 1954 |